(12) United States Patent
Smus (10) Patent No.: US 8,928,587 B1
(45) Date of Patent: Jan. 6, 2015

(54) AUTOMATIC DEVICE LOGIN BASED ON WEARABLE SENSOR FUSION

(71) Applicant: Google Inc., Mountain View, CA (US)

(72) Inventor: Boris Smus, San Francisco, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/089,509

(22) Filed: Nov. 25, 2013

(51) Int. Cl.
G09G 5/00 (2006.01)
G06F 3/033 (2013.01)
G06F 3/041 (2006.01)
G06F 3/01 (2006.01)

(52) U.S. Cl.
CPC ........................................ *G06F 3/017* (2013.01)
USPC ............ 345/156; 345/158; 345/173; 715/863

(58) Field of Classification Search
CPC ........... G06F 3/014; G06F 3/017; G06F 3/03; G06F 3/041
USPC ............ 345/156–175; 463/36–43; 455/404.2, 455/410, 411, 456.1, 456.3; 726/3–5, 726/14–21; 715/863
See application file for complete search history.

(56) References Cited

U.S. PATENT DOCUMENTS

| | | | |
|---|---|---|---|
| 8,155,121 B2* | 4/2012 | Gudan et al. ................... | 370/392 |
| 8,190,129 B2 | 5/2012 | Ben Ayed | |
| 8,219,028 B1* | 7/2012 | Flamholz ...................... | 455/41.2 |
| 8,370,501 B2 | 2/2013 | Shen et al. | |
| 8,391,719 B2* | 3/2013 | Alameh et al. ................ | 398/118 |
| 2005/0093868 A1* | 5/2005 | Hinckley ....................... | 345/502 |
| 2007/0188323 A1* | 8/2007 | Sinclair et al. ............. | 340/568.1 |
| 2007/0223476 A1* | 9/2007 | Fry ............................... | 370/392 |
| 2008/0195735 A1* | 8/2008 | Hodges et al. ................ | 709/227 |
| 2010/0259486 A1* | 10/2010 | Anson et al. ................... | 345/173 |
| 2011/0159857 A1* | 6/2011 | Faith et al. .................. | 455/414.3 |
| 2011/0187642 A1* | 8/2011 | Faith et al. ...................... | 345/158 |
| 2011/0187652 A1* | 8/2011 | Huibers ........................ | 345/173 |
| 2012/0190301 A1 | 7/2012 | Hart | |
| 2013/0065517 A1* | 3/2013 | Svensson et al. ............... | 455/39 |
| 2013/0141325 A1* | 6/2013 | Bailey ........................... | 345/156 |
| 2013/0169571 A1* | 7/2013 | Gai et al. ...................... | 345/173 |
| 2013/0191908 A1 | 7/2013 | Klein | |

* cited by examiner

Primary Examiner — Hong Zhou
(74) Attorney, Agent, or Firm — Morris & Kamlay LLP

(57) ABSTRACT

A user may have a device that contains the user's identity. Rather than log into a second device that user may make use of the fact that the user is already logged into a device as disclosed herein. The user may perform a gesture that may be observed or sensed by one or more sensors on a first device and a second device that contains the user's identity. A correlation between the sensor data may be performed and, if the correlation value exceeds a threshold value, a portion of the user's identity may be shared with the first device.

25 Claims, 6 Drawing Sheets

AUTOMATIC DEVICE LOGIN BASED ON WEARABLE SENSOR FUSION

BACKGROUND

Devices may be considered as belonging to two type classes. A first type of device ("Type 1") may be one in which a user is logged into or that has an account associated with it, such as a smartphone, watch, tablet, or wearable computer with a head mounted display. A second type ("Type 2") may be one in which a user is not logged into, such as a public computer, television, or a friend's laptop. Typically, a Type 1 device is configured to a user's preferences. For example, the user's internet bookmarks, browsing history, saved files or documents, login credentials, etc. Typically, a user would need to log into the Type 2 device, by providing a user name and password for example, if the user would like the Type 2 device to be configured according to the user's preferences.

BRIEF SUMMARY

According to an implementation of the disclosed subject matter, a first indication may be received. The first indication may be based on a gesture detected by a first sensor connected to a first device to which a first identity is not associated. The gesture may correspond to a time reference. A second indication may be received based on the gesture detected by a second sensor connected to a second device to which the first identity is associated. At least part of the first identity may be associated with or to the second device based on the similarity between the first indication and the second indication.

In an implementation, a first indication may be received. The first indication may be based on a gesture detected by a first sensor connected to a first device to which a first identity is not associated. The gesture may correspond to a time reference. A second indication may be received based on the gesture detected by a second sensor connected to a second device to which the first identity is associated. The first indication and the second indication may be correlated to obtain a correlation value. The correlation value may be determined to be above a threshold value. At least part of the first identity may be associated with or to the second device based on the determination that the correlation value is above the threshold value.

In an implementation, a system is provided that includes a first device and a second device. A first identity may not be associated with the first device. The first device may include a first processor, a display, and at least one first sensor. The first device may be configured to receive a first indication based on a gesture detected by the at least one first sensor. The gesture may correspond to a time reference. The first device may receive a second indication based on the gesture detected by a second sensor connected to a second device to which the first identity is associated. It may correlate the first indication and the second indication to obtain a correlation value and determine that the correlation is above a threshold value. The first device may associate at least a part of the first identity to the second device based on the determination that the correlation is above the threshold value. The second device, to which the first identity is associated, may include a second processor and at least one second sensor. It may be configured to provide the second indication to the first device based on the gesture detected by the at least one second sensor. The second device may provide the at least a part of the first identity to the first device.

According to an implementation, a server may receive a first indication based on a gesture detected by a first sensor connected to a first device to which a first identity is not associated. The gesture may correspond to a time reference. The server may receive a second indication based on the gesture detected by a second sensor connected to a second device to which the first identity is associated. It may correlate the first indication and the second indication to obtain a correlation value and determine that the correlation value is above a threshold value. The server may provide a third indication to at least one of the first device and the second device. The third indication may be based on the determination that the correlation value is above the threshold value. The third indication may be a basis for the second device to provide at least a portion of the first identity to the second device.

In an implementation, a system is disclosed that includes a server, a first device, and a second device. The server may include a server processor and be configured to receive a first indication based on a gesture detected by a first sensor connected to a first device to which a first identity is not associated. The gesture may correspond to a time reference. The server may receive a second indication based on the gesture detected by a second sensor connected to a second device to which the first identity is associated. The server may correlate the first indication and the second indication to obtain a correlation value and determine that the correlation value is above a threshold value. The server may provide a third indication to at least one of the first device and the second device. The third indication may be based on the determination that the correlation value is above the threshold value. The third indication may be a basis for the second device to provide at least a portion of the first identity to the second device. The first device may include a first processor and at least one first sensor. The first device may be configured to detect the gesture by the at least one first sensor. The first device may send the first indication of the gesture to the server. The second device may include a second processor and at least one second sensor. The second processor may detect the gesture by the at least one second sensor and send a second indication of the gesture to the server;

An advantage of the implementations disclosed herein is that a device on which a user's identity is already present may be utilized to configure, according to the user's preferences, a second device that does not have the user's identity. Additional features, advantages, and implementations of the disclosed subject matter may be set forth or apparent from consideration of the following detailed description, drawings, and claims. Moreover, it is to be understood that both the foregoing summary and the following detailed description provide examples of implementations and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

The disclosed system can combine signals from sensors on two devices, one of which a user is logged into, a Type 1 device, and the other which the user is not, a Type 2 device, to instill the user's identity, or portion thereof, from the logged-in Type 1 device into the Type 2 device. For example, a signal from a user's gesture on a touchscreen of the Type 2 device (such as a public workstation) can be correlated with a signal from an accelerometer of a smart watch (Type 1 device) being worn on the gesturing arm of the user to produce a signature for the user. If the signals received or detected by each device's sensors correlate, user identity information associated with the smart watch can be instilled into the public workstation. For example, the signature can be used to logon to the user workstation, to provide a credential to an application being accessed by the user through the workstations, etc.

The two devices can be networked and discover each other. A discovery protocol may be utilized that enables at least one of the devices to learn about the other one. For example, a managed DNS broadcast may be used and devices on the same broadcast may be discovered and paired. Once discovered, a network connection may be established between the devices (e.g., a TCP socket, Bluetooth socket, radio broadcast, etc.). After a connection is established, sensor data may be collected on or by both devices (e.g., the smart watch and the public computer). For the watch, data may be obtained from the inertial motion unit ("IMU") such as a compass, a gyroscope, an accelerometer, or a combination thereof. For the public computer, a camera or touch screen may obtain data from the gesture made by the user. For example, the watch's acceleration magnitudes may be compared to an estimation of acceleration magnitudes obtained from touch screen from the public computer. Data may be collected after discovery and shared, but may also be collected before discovery and be stored for sharing after the two devices can communicate with each other.

After collecting and sharing the sensor data, the data from each sensor may be correlated. The correlation may be performed by an application operating on the Type 1 device, Type 2 device, or a remote server. In the above example, the two streams of acceleration values from the touchscreen of the public computer and the smart watch's accelerometer can be correlated to see if they are close enough to one another in time. The acceleration data can be sent from one device to the other or to a remote server for the purposes of determining a correlation value. Both signals can be resampled on the receiving device and correlated. If the correlation value exceeds a minimum threshold value, the user can be logged on to the Type 2 device; otherwise, login fails. Other techniques may be utilized to correlate the data as well, such as comparing discrete features from the two streams.

In an implementation, the user can be required to use a variable path gesture rather than a fixed swipe in order to unlock the Type 2 device. In another implementation, the user may utilize a secret unlock pattern specific to the user to succeed in logging in to the Type 2 device. This can provide a second factor for authentication, the first factor being an above-threshold correlation between data gathered by the two sensors for the same gesture. The non-logged-in device does not need to be stationary. For example, a user can unlock a shared tablet with a gesture using a smart watch on the gesturing arm to enable identity sharing. Wearable Type 1 devices can be, for example, watches, bracelets, rings, etc. Data from more than one sensor on a Type 1 and/or Type 2 device can be used. Sensor data from more than two devices can be used. For example, a gesture by a user wearing a Type 1 device seeking to logon to a Type 2 device may be sensed by a third device (either Type 1 or Type 2). The data from the third device can be correlated with data from the first Type 1 device, the first Type 2 device or both. If all three signals correlate, then the user can be automatically logged on to the first Type 2 device.

There are several possible consequences of a successful correlation. In an implementation, the Type 2 device may be unlocked so that the user can utilize it or provide additional credentials to access applications and data. In another implementation, one or more user credentials (user ids, passwords) can be sent from the Type 1 device to the Type 2 device. In another implementation, a user environment (e.g., user profile data, user data, applications, etc.) can be sent to the non-logged-in-device.

Figure 1:
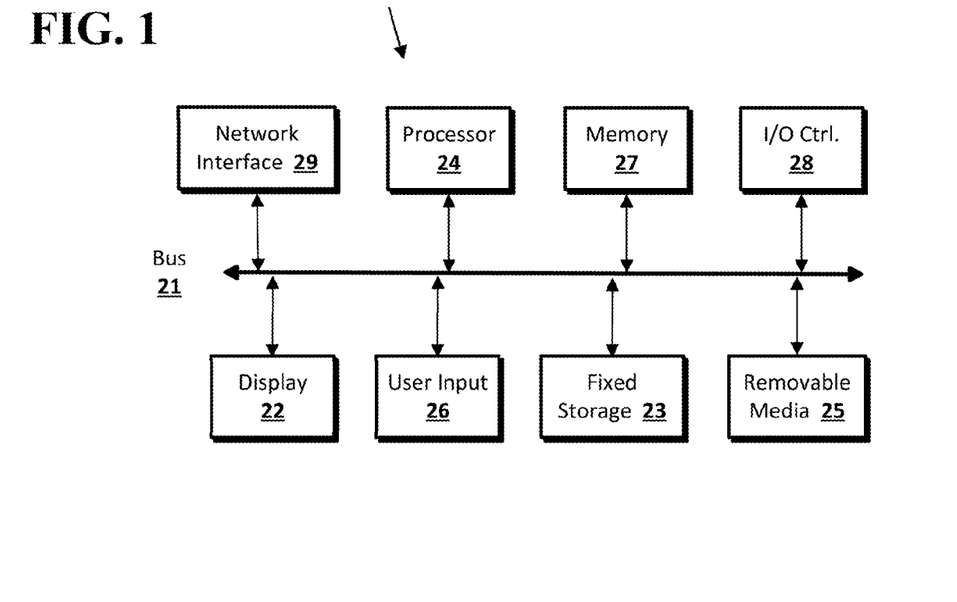
FIG. 1 shows a computer according to an implementation of the disclosed subject matter.

Implementations of the presently disclosed subject matter may be implemented in and used with a variety of component and network architectures. FIG. 1 is an example computer 20 suitable for implementations of the presently disclosed subject matter. The computer 20 includes a bus 21 which interconnects major components of the computer 20, such as a central processor 24, a memory 27 (typically RAM, but which may also include ROM, flash RAM, or the like), an input/output controller 28, a user display 22, such as a display screen via a display adapter, a user input interface 26, which may include one or more controllers and associated user input devices such as a keyboard, mouse, and the like, and may be closely coupled to the I/O controller 28, fixed storage 23, such as a hard drive, flash storage, Fibre Channel network, SAN device, SCSI device, and the like, and a removable media component 25 operative to control and receive an optical disk, flash drive, and the like.

The bus 21 allows data communication between the central processor 24 and the memory 27, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as a hard disk drive (e.g., fixed storage 23), an optical drive, floppy disk, or other storage medium 25.

The fixed storage 23 may be integral with the computer 20 or may be separate and accessed through other interfaces. A network interface 29 may provide a direct connection to a remote server via a telephone link, to the Internet via an internet service provider (ISP), or a direct connection to a remote server via a direct network link to the Internet via a POP (point of presence) or other technique. The network interface 29 may provide such connection using wireless techniques, including digital cellular telephone connection, Cellular Digital Packet Data (CDPD) connection, digital satellite data connection or the like. For example, the network interface 29 may allow the computer to communicate with other computers via one or more local, wide-area, or other networks, as shown in FIG. 2.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 27, fixed storage 23, removable media 25, or on a remote storage location.

Figure 2:
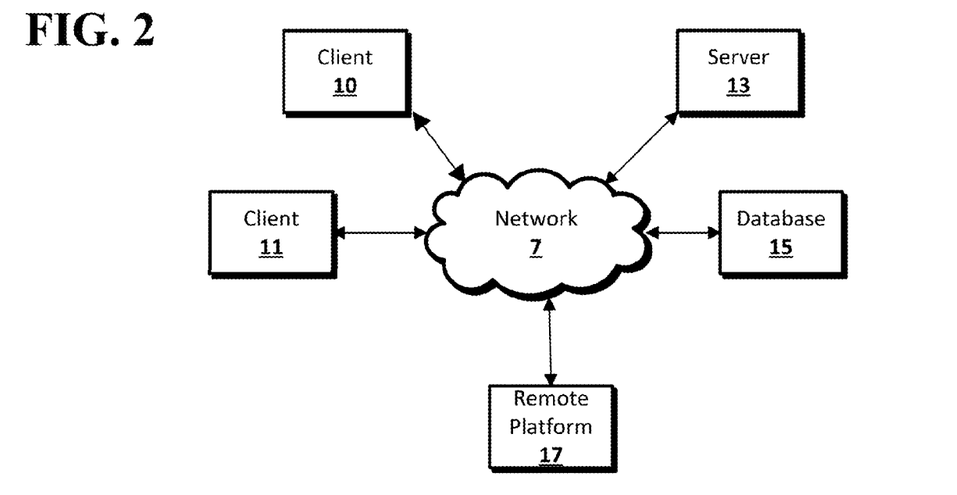
FIG. 2 shows a network configuration according to an implementation of the disclosed subject matter.

FIG. 2 shows an example network arrangement according to an implementation of the disclosed subject matter. One or more clients 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more servers 13 and/or databases 15. The devices may be directly accessible by the clients 10, 11, or one or more other devices may provide intermediary access such as where a server 13 provides access to resources stored in a database 15. The clients 10, 11 also may access remote platforms 17 or services provided by remote platforms 17 such as cloud computing arrangements and services. The remote platform 17 may include one or more servers 13 and/or databases 15.

More generally, various implementations of the presently disclosed subject matter may include or be implemented in the form of computer-implemented processes and apparatuses for practicing those processes. Implementations also may be implemented in the form of a computer program product having computer program code containing instructions implemented in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing implementations of the disclosed subject matter. Implementations also may be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Implementations may be implemented using hardware that may include a processor, such as a general purpose microprocessor and/or an Application Specific Integrated Circuit (ASIC) that implements all or part of the techniques according to implementations of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to implementations of the disclosed subject matter.

Figure 3:
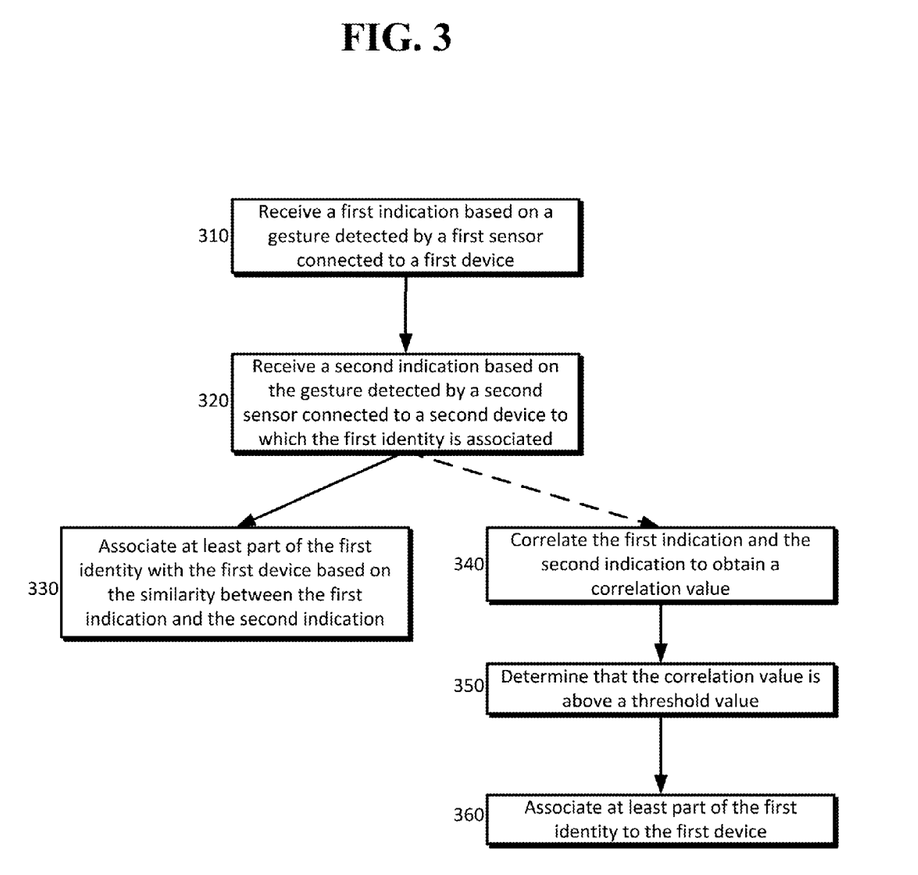
FIG. 3 is an example method for associating a first identity with a first device based on a gesture correlation with a second device as disclosed herein.

In an implementation, as shown in the example provided in FIG. 3, a first indication may be received based on a gesture detected by a first sensor connected to a first device to which a first identity is not associated (e.g., a Type 2 device) at 310. As stated earlier, the first device may be a public workstation or computer and it may have other user identities associated with it or previously associated with it; however, it does not have the first identity associated with it. Sensors, such as a one or more cameras or touch-sensitive areas, connected to the first device may be utilized to detect a gesture. The first indication may correspond to the data generated by the sensors or the processed data. For example, a processor may perform gesture recognition on data provided by an infrared camera and store in memory the identity of the gesture detected.

The gesture may correspond to a time reference. Images received from a camera, for example, may be time stamped. The time reference may be used, as described below, as a basis to correlate data obtained from sensors from a second device. For example, a second device may provide accelerometer data, gyroscope data, and/or compass data from its IMU and these data may be time stamped as well. The data from the IMU of the second device and the first device's camera data may be aligned based on the time references associated with each respective data set to determine if the gesture detected by the camera matches the accelerometer and/or compass data of the IMU. In some implementations, a time stamp is not necessary; rather, the data provided from each device can be compared to determine, for example, if any gesture detected by the camera would match any pattern discerned from the IMU data of the second device.

A second indication may be received based on the gesture detected by a second sensor connected to a second device to which the first identity is associated at 320. The second device may be, for example, a smart watch, a smartphone, a tablet, a laptop, etc. The first sensor and the second sensor may be the same. For example, both sensors may be a camera or a touch screen. The first identity may refer to an account, a user name, a user password, a browsing history, a bookmark, an electronic document, a picture, a video, etc. More than one sensor may provide an indication based on a gesture for the first device or the second device. For example, the second device may utilize its IMU data and a camera to detect the gesture and provide the second indication thereof. Similarly, the first device may utilize a camera and a touchscreen to detect the gesture and provide the first indication thereof.

FIG. 3 illustrates two example processes. In one branch, represented at 330, at least a part of the first identity may be associated to the first device based on a similarity between the first indication and the second indication. A similarity may be determined based on the sensor data representing each of the first indication and the second indication. The sensor data may be compared to determine whether the pattern represented by the data for the first indication is similar to the pattern represented by the data for the second indication. In some instances, a threshold value of similarity may be predefined. A similarity may be represented by a correlation or a pattern recognition, for example. If the similarity between the data generated by the first sensor and the data generated by the second sensor exceeds the threshold, then the first indication and the second indication may be deemed sufficiently similar such that at least a portion of the first identity may be associated with the first device.

In the other example process shown in FIG. 3, the first indication and the second indication may be correlated to obtain a correlation value at 340. Correlation may be performed using a variety of techniques such as Pearson's correlation coefficient or other methods known in the art for either linear or non-linear data including rank correlation coefficients. The correlation value may be determined to be above a threshold value at 350. The threshold value may be adjustable to increase the stringency of a match between the Type 1 device and the Type 2 device in order for the first identity to be associated with the Type 2 device from the Type 1 device. At least part of the first identity may be associated with the first device based on the determination that the correlation is above the threshold value at 360.

Figure 4:
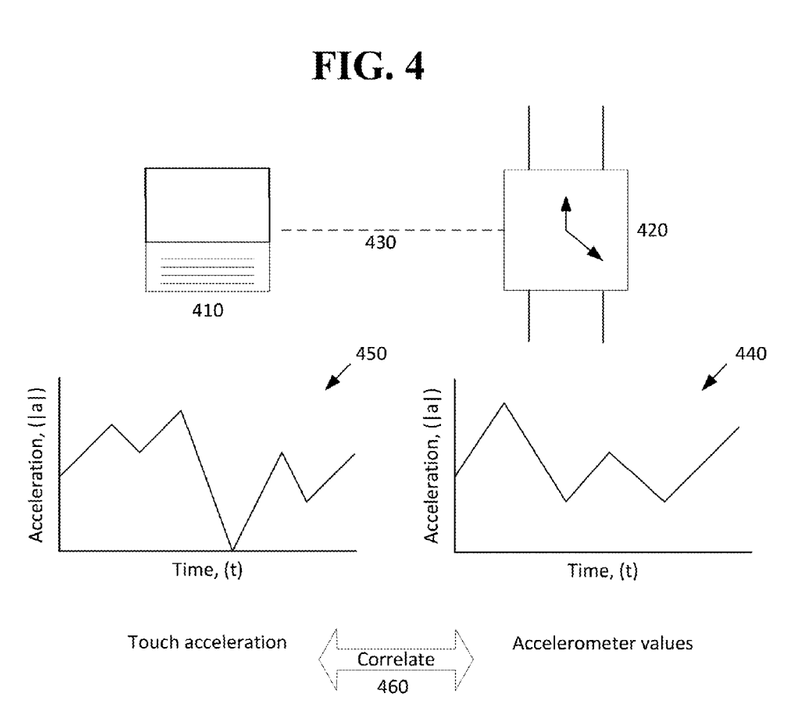
FIG. 4 is an example of how a correlation value may be obtained between the first device and second device.

An example of how a correlation may be performed is provided in FIG. 4. In this example, the Type 2 device is a laptop computing device 410 and the Type 1 device is a smart watch 420 (i.e., it contains the first identity). The devices may be discovered or paired initially by a number of methods, some of which are described below in more detail. In the provided example, the devices are communicating over TCP 430. The laptop 410 may prompt the user to draw a pattern on the screen. The pattern may be preselected by the laptop 410 or the user may draw a pattern at the user's discretion. In some instances, the pattern drawn by the user may not provide sufficient data from which a statistically significant correlation value can be derived. The user may be prompted to redraw a longer or more complicated pattern. Acceleration data 440 may be collected from the watch's IMU (specifically, the accelerometer). The touch screen of the laptop 410 may track the user's finger movements or cameras may be used to track the user's gestures if the user does not contact the screen. Acceleration data 450 may be derived directly from the touch input movements captured as the user traces or makes a pattern. Acceleration data 450 may be derived from the data obtained by the camera with respect to the user's gestures. For example, a camera may capture time stamped images of the user's hand movements. As the user traces the pattern, the time stamped images may be utilized to determine the user's position relative to time and, consequently, acceleration. Once the acceleration data 440, 450 from each device have been obtained, they may be compared to obtain a correlation value 460.

A gesture may refer to a pattern that a user traces on a touchscreen or a movement of a portion of a body (such as head, hand, eyes, etc.) to express an idea. In some instances, a user may perform a gesture that is specific to the user and/or the first identity. Thus, performing the gesture in front of the first device post pairing of the first device and the second device may be sufficient to authenticate the first identity to the first device. Similarly, the type of gesture received by the first device may determine a level of access to the first identity or the first device. For example, a particular gesture may be associated with guest access privileges for the first identity that may allow access to bookmarks associated with the first identity. A different gesture may be used to obtain access to pictures and email associated with the first device. Still another gesture may be used to access pictures, email, documents, preferences, bookmarks, etc. associated with the first identity.

In some configurations, each device may send its acceleration data to a remote server or a server on the same network as both devices. The server may perform the correlation calculation and return to the devices an indication as to whether they match or are above a threshold value. In some configurations, one of the two devices may perform the correlation calculation and provide an indication of whether or not the correlation value is above a threshold value. Upon receipt of an indication that the correlation value is sufficient or above a threshold value, at least a portion of the first identity may be received by the laptop. For example, the user may open a web browser on the laptop and make use of a browsing history and/or bookmarks. Certain applications, such as an email program or application, may be provided with the user's logon credentials. The portion of the first identity may remain associated with the Type 2 device until the user logs out of the Type 2 device, disconnects the communication between the Type 1 and Type 2 device, and/or moves the Type 1 beyond a predetermined distance from the Type 2 device. In some configurations, the portion of the first identity associated with the first device may utilize the server as an intermediary instead of directly communicating the portion of the first identity between the first device and the second device.

Discovering and/or pairing between the first device and the second device may be performed using a variety of methods. In some configurations, the second device may receive a prompt that the first device is available when the second device connects to the same network to which the first device is connected. In instances where there is more than one first device, the user may be asked to input a serial number or pin for the specific first device with which the user would like to pair the second device. Upon entering the serial number into the prompt, the user may be asked to trace the pattern on the first device. Other methods of pairing may be used such as Bluetooth or near-field communication. In some configurations, a user may be asked to scan, with the second device, a QR code that takes the user to a web page which will open a web page through which the user may link the first device and the second device. Other mechanisms of discovering a device are known and may be used in combination with implementations disclosed herein.

The second device may be determined to be within a threshold distance of the first device. For example, after pairing the first device and the second device, a proximity sensor such as a depth camera on the first device may be used to determine the distance between the user and the first device. In the event the user exceeds a threshold distance, communication or pairing between the first device and the second device may be terminated. For example, if the first device is a laptop, a camera on the laptop may ascertain that the user is within a half meter from the camera. If the user moves beyond one meter away from the laptop, a processor on the laptop that is connected to the camera may determine that the user has exceeded a threshold distance (e.g., that is set at one meter) and disconnect the second device from the first device. Disconnecting the first device from the second device may refer to cessation of communication between the two devices and/or that the first identity is no longer shared with the first device. The first device may remove authentication associated with the first identity from its memory such that a subsequent user cannot use the first device using a portion of the first identity. Audio chirps may be used between the first device and second device to ascertain proximity of the two devices to one another as well.

Figure 5:
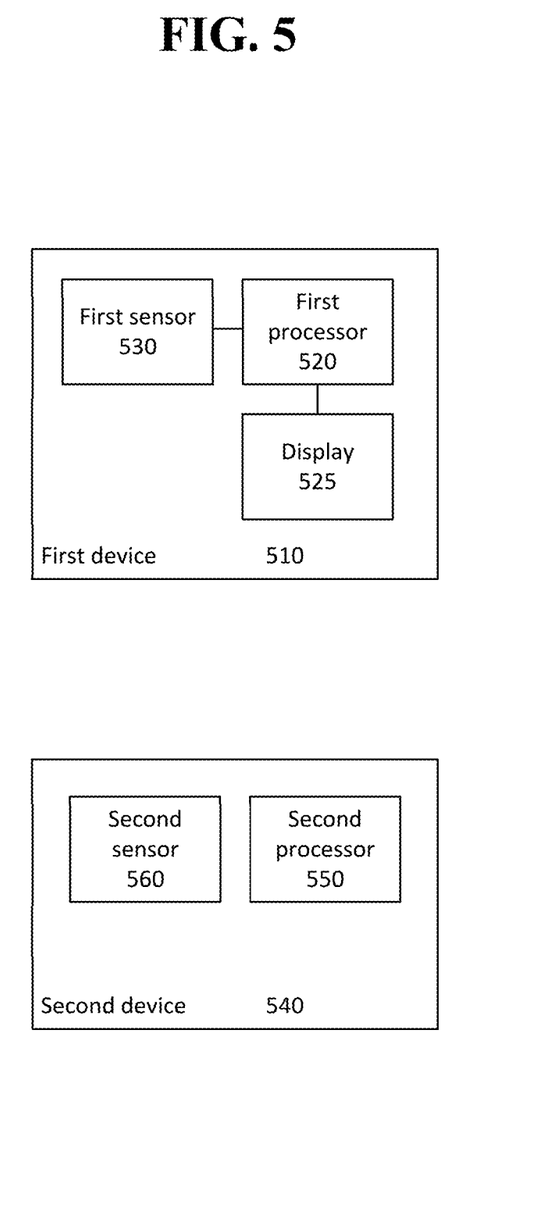
FIG. 5 is an example system for associating a first identity with a first device based on a gesture correlation with a second device according to an implementation.

In an implementation, an example of which is provided in FIG. 5, a system is provided that includes a first device 510 and a second device 540. The first device may not have the first identity associated with it. It may include a first processor 520, a display 525, and at least one first sensor 530. The first processor 520 of the first device 510 may be configured to receive a first indication based on a gesture detected by the at least one first sensor, the gesture corresponding to a time reference. It may receive a second indication based on the gesture detected by a second sensor connected to a second device 540 to which the first identity is associated. As described above, the first processor 520 may associate at least a part of the first identity to the first device based on a similarity between the first indication and the second indication. In some configurations, the first processor 520 may correlate the first indication and the second indication to obtain a correlation value; and determine whether the correlation value is above a threshold value. The first processor 520 may associate at least a part of the first identity to the second device based on the determination that the correlation is above the threshold value. For example, the second device 540 may receive an indication of the correlation value and permit access to at least a portion of the first identity by the first device. The second device 540 to which the first identity is associated may include a second processor 550 and at least one second sensor 560. The second processor 550 may be configured to provide a second indication to the first device 510 based on the gesture detected by the at least one second sensor 560. It may provide the at least a part of the first identity to the first device 510 based on the determination of the correlation value and/or that it exceeds the threshold value. In some configurations, a determination of the correlation value and/or threshold value may be performed by the second processor or a server that is remote from the first device and/or second device.

Figure 6:
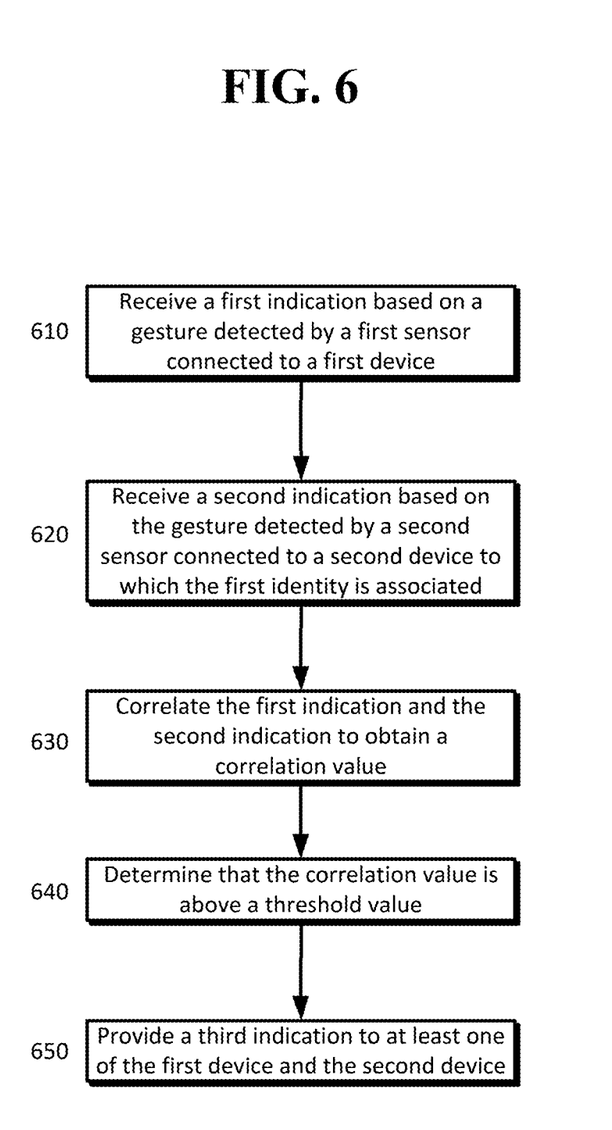
FIG. 6 is an example method for associating a first identity with a first device based on a gesture correlation with a second device using a server intermediary as disclosed herein.

In an implementation, an example of which is provided in FIG. 6, a server may receive a first indication based on a gesture detected by a first sensor connected to a first device to which a first identity is not associated at 610. As described above, the gesture may be associated with a time reference. The server may receive a second indication based on the gesture detected by a second sensor connected to a second device to which the first identity is associated at 620. For example, the first device and the second device may each send sensor data or indications thereof to a remote server or a server connected to the same network as the first device and the second device. The server may correlate the first indication and the second indication to obtain a correlation value at 630 and determine that the correlation value is above a threshold value at 640. The server may provide a third indication to at least one of the first device and the second device 650. The third indication may be based on the determination that the correlation value is above the threshold value. The third indication may be basis for the second device to provide at least a portion of the first identity to the first device.

Figure 7:
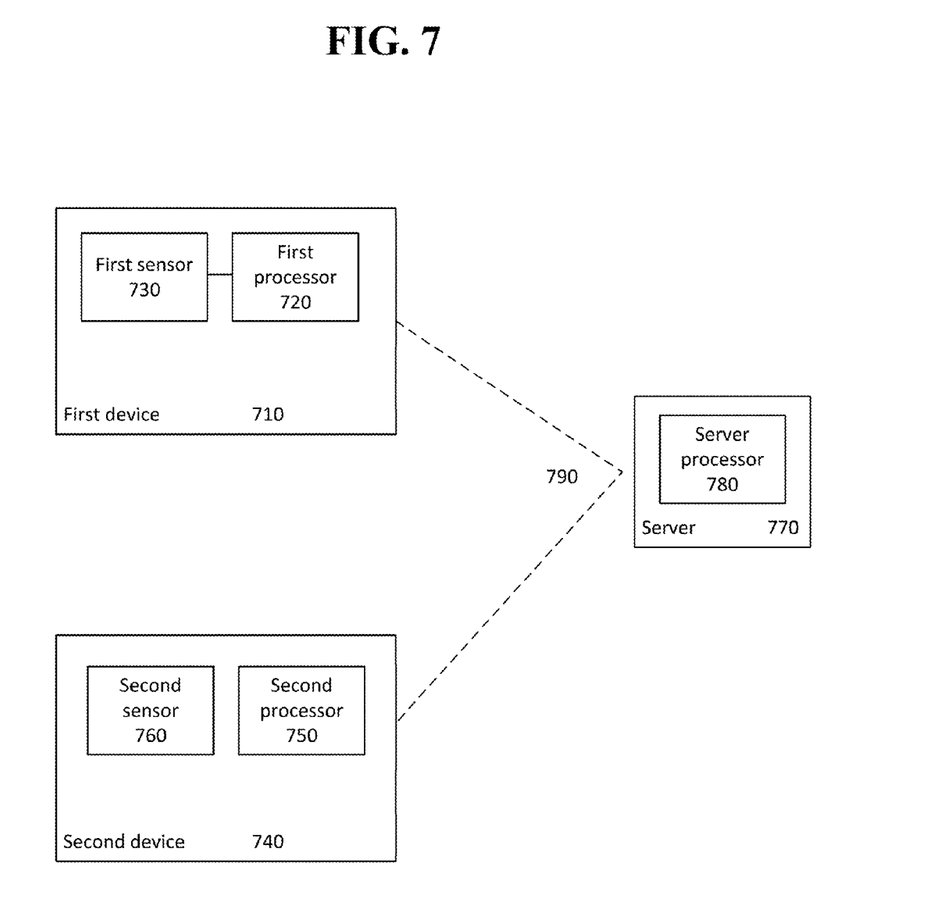
FIG. 7 is an example system for associating a first identity with a first device based on a gesture correlation with a second device using a server intermediary as disclosed herein.

In an implementation, a system is disclosed that includes a server, a first device, and a second device. FIG. 7 is an example of the disclosed system. The server 770 may include a server processor 780 that is configured to receive a first indication based on a gesture detected by a first sensor 730 connected to a first device 710 to which a first identity is not associated. The server processor 780 may receive a second indication based on the gesture detected by a second sensor 760 connected to a second device 740 to which the first identity is associated. The server 770 may be connected to the first device 710 and the second device 740 by a network connection 790, for example. The server 770 may correlate the first indication and the second indication to obtain a correlation value and determine that the correlation value is above a threshold value. The server processor 780 may provide a third indication to at least one of the first device 710 and the second device 740. As stated above, the third indication may be based on the determination that the correlation value is above the threshold value and provide a basis for the second device 740 to provide at least a portion of the first identity to the first device 710.

The first device 710 may include a first processor 720 and at least one first sensor 730. The first processor 720 may be configured to detect the gesture by the at least one first sensor 730. The gesture may be associated with a time reference such as one or more time stamped images captured from a camera or accelerometer data. The first processor 720 may be configured to send a first indication of the gesture to the server 770. The second device 740 may include a second processor 750 and at least one second sensor 760. The second processor 750 may detect the gesture by the at least one second sensor 760 and send a second indication of the gesture to the server 770. At least one of the first device 710 or the second device 740 may receive the third indication. In some configurations, the second device 740 may provide at least a portion of the first identity to the server 770 based on the third indication. The server 770 may provide the portion of the first identity to the first device 710.

In some configurations, the server may be a cloud based server that hosts the first identity. For example, the user's preferences, bookmarks, browsing history, purchase history, logon information, credentials, etc. may be stored in a cloud computing system (i.e., the server). Subsequent to determining the correlation value exceeds the threshold value, the server may provide the portion of the first identity to the first device. Thus, the server may act independently of the second device with respect to the first identity as opposed to acting as a conduit for the first identity between the first device and the second device.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
receiving a first indication based on a gesture detected by a touch sensitive display connected to a first device to which a first identity is not associated, wherein the first identity comprises at least one credential of a user;
receiving a second indication based on the gesture detected by an accelerometer connected to a watch to which the first identity is associated, wherein the first device and the watch do not physically contact one another during performance of the gesture; and
associating at least part of the first identity to the first device based on a similarity between the first indication and the second indication, wherein the association of at least part of the first identity with the first device allows the first device to provide the at least one credential to an application being accessed by the user on the first device.

2. The method of claim 1, further comprising pairing the first device and the watch.

3. The method of claim 1, further comprising discovering, by the first device, the watch.

4. The method of claim 1, further comprising determining that the watch is within a threshold distance of the first device.

5. The method of claim 1, wherein the gesture comprises a signature that is unique to the first identity.

6. The method of claim 1, wherein the gesture received determines a level of access to one or both of the first device or information about the first identity.

7. The method of claim 1, further comprising specifying the gesture by the first device.

8. The method of claim 1, further comprising receiving, by the first device, the portion of the first identity from the watch.

9. The method of claim 1, wherein the first device comprises a camera.

10. The method of claim 1, wherein the gesture corresponds to a time reference.

11. The method of claim 1, further comprising correlating the first indication and the second indication to obtain a correlation value.

12. The method of claim 11, further comprising determining that the correlation value is above a threshold value.

13. A system, comprising:
a first device to which a first identity is not associated, wherein the first identity comprises at least one credential of a user and wherein the first device comprising a first processor, and a touch sensitive display, configured to:
receive a first indication based on a gesture detected by the touch sensitive display;
receive a second indication based on the gesture detected by an accelerometer connected to a watch to which the first identity is associated, wherein the first device and the watch do not physically contact one another during performance of the gesture;
associate at least a part of the first identity to the first device based on a similarity between the first indication and the second indication, wherein the association of at least part of the first identity with the first device allows the first device to provide the at least one credential to an application being accessed by the user on the first device; and
the second device to which the first identity is associated, the second device comprising a second processor and at least one second sensor, configured to:
provide a second indication to the first device based on the gesture detected by the accelerometer; and
provide the at least a part of the first identity to the first device.

14. The system of claim 13, the first processor further configured to pair the first device and the watch.

15. The system of claim 13, the first processor further configured to discover the watch.

16. The system of claim 13, the first processor further configured to determine that the watch is within a threshold distance of the first device.

17. The system of claim 13, wherein the gesture comprises a signature that is unique to the first identity.

18. The system of claim 13, wherein the gesture received determines a level of access to one or both of the first device or information about the first identity.

19. The system of claim 13, the first processor further configured to specify the gesture by the first device.

20. The system of claim 13, the first processor further configured to receive the portion of the first identity from the watch.

21. The system of claim 13, wherein the first device comprises a camera.

22. The system of claim 13, the first processor further configured to correlate the first indication and the second indication to obtain a correlation value.

23. The system of claim 22, the first processor further configured to determine that the correlation value is above a threshold value.

24. A method, comprising:
receiving, by a server, a first indication based on a gesture detected by a touch sensitive display connected to a first device to which a first identity is not associated, the gesture corresponding to a time reference, wherein the first identity comprises at least one credential of a user;
receiving, by the server, a second indication based on the gesture detected by an accelerometer connected to a watch to which the first identity is associated, wherein the first device and the watch do not physically contact one another during performance of the gesture;
correlating, by the server, the first indication and the second indication to obtain a correlation value;
determining that the correlation value is above a threshold value; and
providing a third indication to at least one of the first device and the watch, wherein the third indication is based on the determination that the correlation value is above the threshold value and wherein the third indication is a basis for the watch to provide at least a portion of the first identity to the first device and allows the first device to provide the at least one credential to an application being accessed by the user on the first device.

25. A system, comprising:
a server comprising a server processor, the server processor configured to:
receive a first indication based on a gesture detected by a touch sensitive display connected to a first device to which a first identity is not associated, the gesture corresponding to a time reference, wherein the first identity comprises at least one credential of a user;
receive a second indication based on the gesture detected by an accelerometer connected to a watch to which the first identity is associated, wherein the first device and the watch do not physically contact one another during performance of the gesture;
correlate the first indication and the second indication to obtain a correlation value;
determine that the correlation value is above a threshold value; and provide a third indication to at least one of the first device and the watch wherein the third indication is based on the determination that the correlation value is above the threshold value and wherein the third indication is a basis for the watch to provide at least a portion of the first identity to the first device and allows the first device to provide the at least one credential to an application being accessed by the user on the first device; and a first device comprising a first processor and a touch sensitive display, configured to:

detect the gesture by the touch sensitive display, the gesture corresponding to the time reference;

send a first indication of the gesture to the server;

a watch comprising a second processor and an accelerometer, configured to:

detect the gesture by the accelerometer;

send a second indication of the gesture to the server.

* * * * *